United States Patent
Rector

[11] Patent Number: 6,042,134
[45] Date of Patent: Mar. 28, 2000

[54] PARALLEL LINKAGE STEERING FOR A BICYCLE

[76] Inventor: Michael Alan Rector, 200 Heavenly Valley Rd., Newbury Park, Calif. 91320

[21] Appl. No.: 09/041,883

[22] Filed: Mar. 12, 1998

[51] Int. Cl.[7] .................................................. B62K 21/02
[52] U.S. Cl. ....................................... 280/288.1; 280/263
[58] Field of Search ................................... 280/270, 263, 280/274, 277, 282, 288.1, 771, 93.502, 93.51, 93.511

[56] References Cited

U.S. PATENT DOCUMENTS

| | | | |
|---|---|---|---|
| 227,746 | 5/1880 | Fancher . | |
| 295,257 | 3/1884 | Lloyd . | |
| 538,482 | 4/1895 | Doan et al. | 280/270 |
| 609,151 | 8/1898 | Killen | 280/270 |
| 833,651 | 10/1906 | Tooley . | |
| 1,668,368 | 5/1928 | Herds | 280/93.51 |
| 1,743,121 | 1/1930 | Edele | 280/263 |
| 3,960,392 | 6/1976 | Read | 280/282 |
| 4,353,567 | 10/1982 | Weldy | 280/92 |
| 4,572,535 | 2/1986 | Stewart et al. | 280/282 |
| 4,773,499 | 9/1988 | Frye | 180/152 |
| 4,773,663 | 9/1988 | Sawyer et al. . | |
| 5,782,480 | 7/1998 | Phillips | 280/282 |

*Primary Examiner*—Daniel G. DePumpo
*Assistant Examiner*—Christopher D Bottorff

[57] ABSTRACT

Each end of the axle of the front wheel of a bicycle is connected with a pivot to a support arm. These two support arms are substantially parallel to each other and substantially extend from the front wheel axle area to a distance behind the front wheel. Behind the front wheel, a cross bar connects the support arms together utilizing pivots in the connections. Behind the first cross bar, a second cross bar connects the support arms together utilizing pivots in the connections. The center of both of these cross bars is connected to the frame of the bicycle through a pivot. The two cross bars and the axle of the front wheel are substantially parallel to each other. The axial axis of the pivots are all substantially parallel to each other, with the axial axis of the pivots being reclined nominally 20 degrees in the rearward direction from vertical. The pivots used in the connections permit the angle to vary between a support arm and the axle of the front wheel. Linkages connected to one of the support arms permit the bicycle operator to hold steady or move the support arm relative to the pivots in the center of the cross bars. When the bicycle rider thereby moves the side member, the angle between the wheel and the bicycle frame members changes, and thereby steering of the bicycle is achieved.

19 Claims, 3 Drawing Sheets

PARALLEL LINKAGE STEERING FOR A BICYCLE

BACKGROUND OF THE INVENTION

1. Field of the Invention

This invention relates generally to bicycles, motorized cycles, and other land vehicles, and more particularly to front wheel support structures and steering mechanisms for recumbent bicycles.

2. Background Information

Bicycles principally use a pivoting fork to support and steer the front wheel. This fork normally connects to the bicycle frame above the front wheel. Bicycle frame members above the front wheel and fork members on the sides of the front wheel provide more resistance moving through the air than those located behind the front wheel or along the direction of movement of the bicycle. Also bicycle frame members above the front wheel block the forward view of the bicycle rider on some bicycles designed to position the rider such that less resistance is encountered when moving through the air. Also fork members to the sides of the front wheel interfere with rider leg pedaling movement on some bicycles designed to position the rider such that less resistance is encountered when moving through the air. Therefore a new method to support the front wheel and steer a bicycle is needed.

U.S. Pat. No. 227,746 to J. A. Fancher discloses a prior art whereby the front wheel of a tricycle is vertically restrained within a frame member directly to each side of the axle of the front wheel, with guide pins inserted into the axle on each side of the wheel and riding in a semi-circular slot contained in the frame member on each side of the front wheel, and thereby supporting the front wheel and facilitating steering without the use of a common bicycle fork. This method and subsequently disclosed improvements on this method requires substantial frame members on each side of the front wheel at the axle line. Such frame members and placements will interfere with rider leg movements and result in substantial air resistance. Therefore this prior art does not offer a satisfactory new method to support the front wheel and steer a bicycle.

U.S. Pat. No. 4,773,663 to Sawyer et al discloses a prior art whereby the front wheel of a bicycle is supported and steering is facilitated by multiple rotational antifriction bearing placements within the hub of the front wheel. Such a method requires a substantial amount of precision fabricated components which are relatively costly. Therefore this prior art does not offer a satisfactory new method to support the front wheel and steer a bicycle.

Accordingly, it is the principal object of the present invention to eliminate the need for bicycle frame members above the front wheel, to not have members to the sides of the front wheel which will interfere with rider leg pedaling movements or increase resistance when moving through the air, to not require costly fabrication of precision mechanisms, and yet provide a means for the rider to steer the bicycle.

SUMMARY OF THE INVENTION

This invention is a mechanism for steering a bicycle without the need for substantial mechanisms or mechanical supports at the center of or above the front wheel of the bicycle. This is achieved by connecting the front wheel through pivots to a support arm on each side of the front wheel, connecting together these support arms behind the front wheel with two cross bars and using pivots in the connections, connecting the two cross bars to the bicycle frame using pivots, and providing a means for the bicycle rider to move the side bars such that the front wheel is pivoted and steering is effected.

Figure 1:
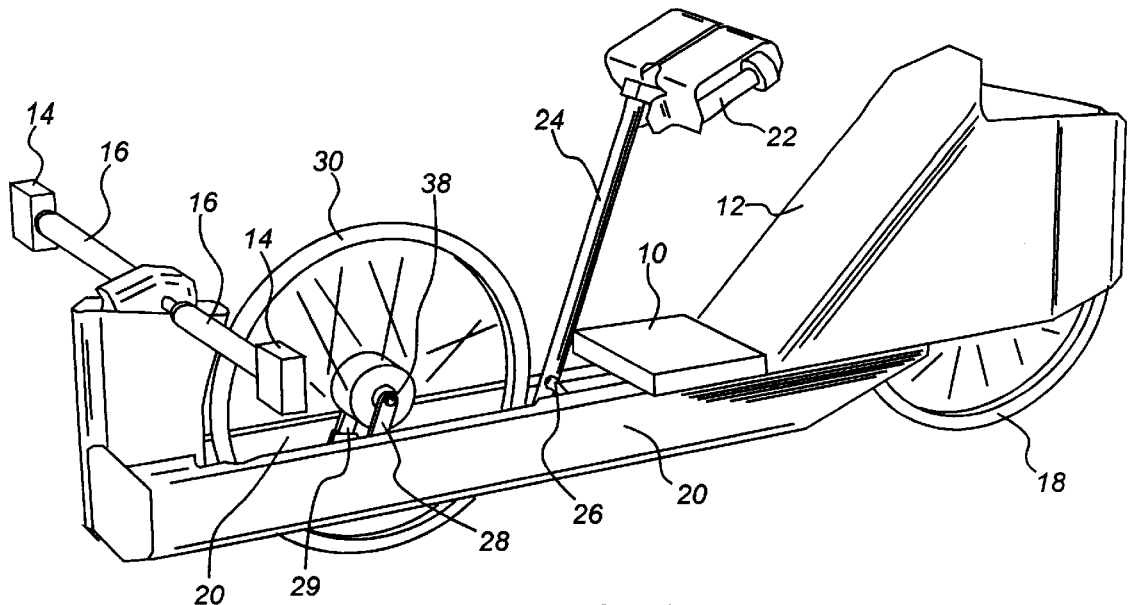
FIG. 1 is a perspective view of a bicycle incorporating the invention.

REFERENCE NUMERALS IN DRAWINGS 10 seat
12 seat back
14 pedals
16 crank arms
18 rear wheel
20 side frame members
22 hand grips
24 steering shaft
26 upper ball and socket joint
28 first front wheel mounting bar
29 second front wheel mounting bar
30 front wheel
32 upper steering shaft mounting bracket
34 lower steering shaft mounting bracket
36 mounting plates
38 axle
40 first mounting block
41 second mounting block
42 first front bearing block
43 second front bearing block
44 first support arm
45 second support arm
48 pivot axis
50 horizontal axis
52 parallel front wheel radial axis
54 center bearing block
56 first cross bar
58 second cross bar
62 threaded rod
64 lower ball and socket joint
66 normal radial axis location
68 full clockwise radial axis location
69 full counter-clockwise radial axis location
71 first pivot
72 second pivot
73 third pivot
74 fourth pivot
75 fifth pivot
76 sixth pivot
77 seventh pivot 78 eighth pivot
81 first side bearing block
82 second side bearing block
83 third side bearing block
84 fourth side bearing block

DESCRIPTION OF THE PREFERRED EMBODIMENT

Referring now to the drawings, the steering mechanism of the present invention is generally illustrated in FIG. 1, which is a perspective view of a recumbent bicycle containing the present invention. The rider of this bicycle sits in the seat 10 with his back against the seat back 12. The rider propels the bicycle by applying pedaling forces principally with his legs to the pedals 14 which are mounted near the end of crank arms 16. The pedaling forces are transferred to the rear wheel 18 through chains and sprockets commonly used on bicycles. The side frame members 20 provide the principal structure for connecting the bicycle assemblies together.

The rider steers the bicycle illustrated in FIG. 1 by applying side directional forces principally with his arms to the hand grips 22. These steering forces are transferred by way of the steering shaft 24 through the upper ball and socket joint 26, and result in the front wheel 30 changing direction.

Figure 2:
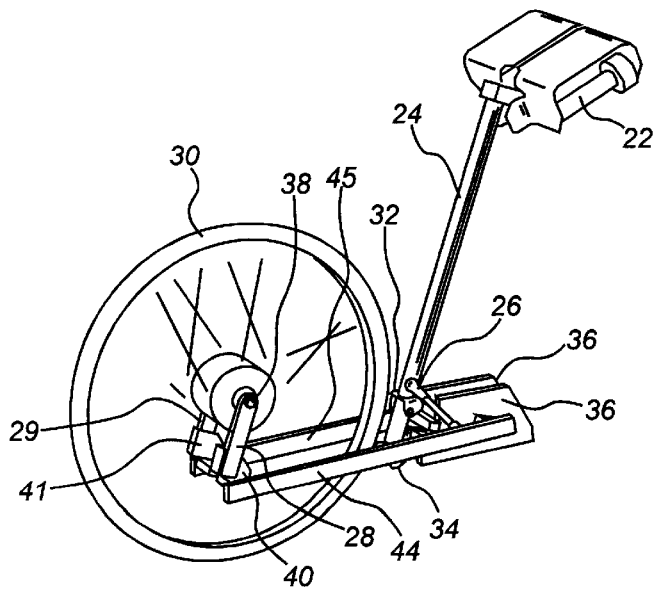
FIG. 2 is a perspective view of the bicycle steering mechanism removed from the bicycle.

FIG. 2 is a perspective view of the bicycle steering mechanism removed from the bicycle illustrated in FIG. 1. The steering shaft 24 rides in common rotational antifriction bearings in the upper steering shaft mounting bracket 32 and in the lower steering shaft mounting bracket 34. When installed in the bicycle illustrated in FIG. 1, the upper steering shaft mounting bracket 32 and the lower steering shaft mounting bracket 34 are fastened to the side frame members 20 shown in FIG. 1 using common screws and nuts. With this arrangement the steering shaft 24 is restrained rigidly to the side frame members 20 yet is free to rotate about the longitudinal axis of the steering shaft 24 in response to steering forces applied to the hand grips 22 by the bicycle rider. The mounting plates 36 of the steering mechanism illustrated in FIG. 2 are fastened to the side frame members 20 of FIG. 1 using common screws and nuts. With this arrangement the steering mechanism shown in FIG. 2 is rigidly fastened to and becomes a part of the bicycle illustrated in FIG. 1.

Figure 3:
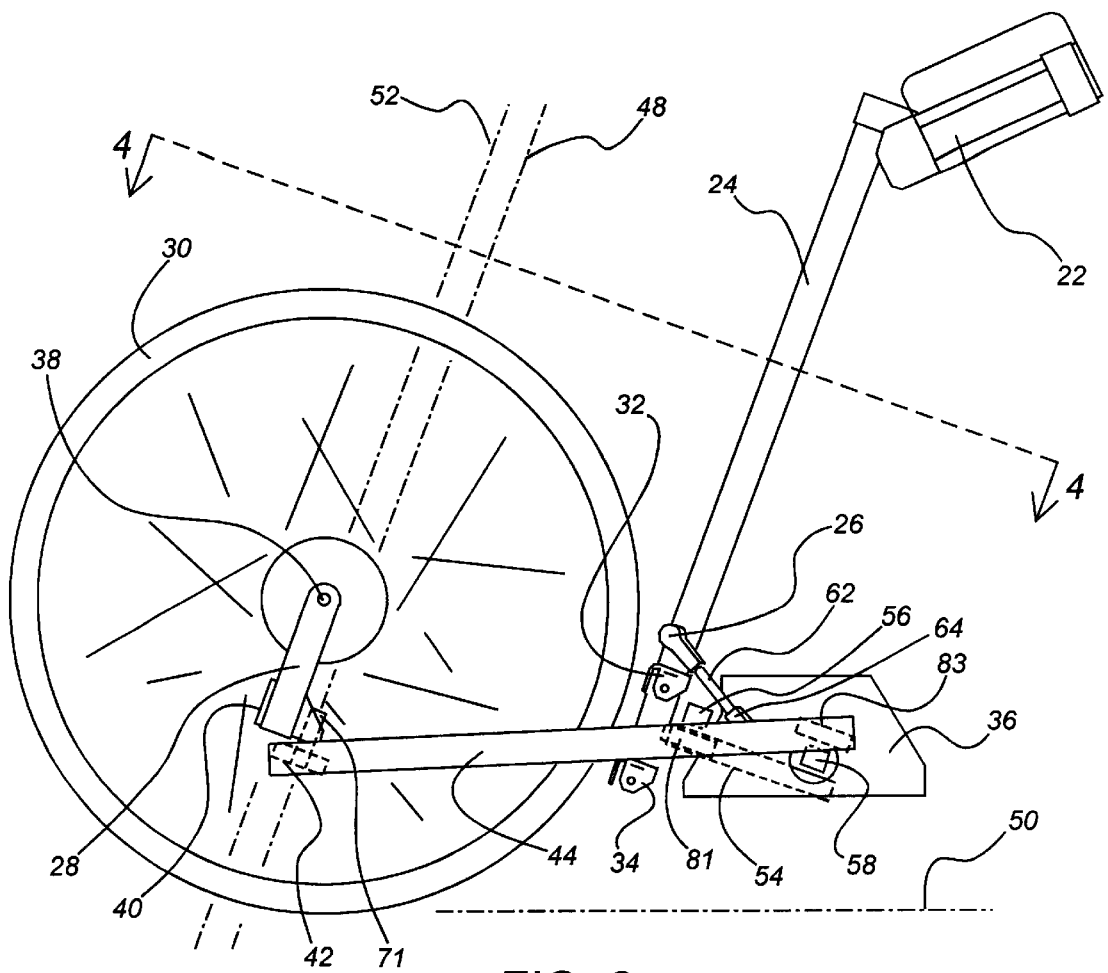
FIG. 3 is a side view of the steering mechanism removed from the bicycle.
Figure 4:
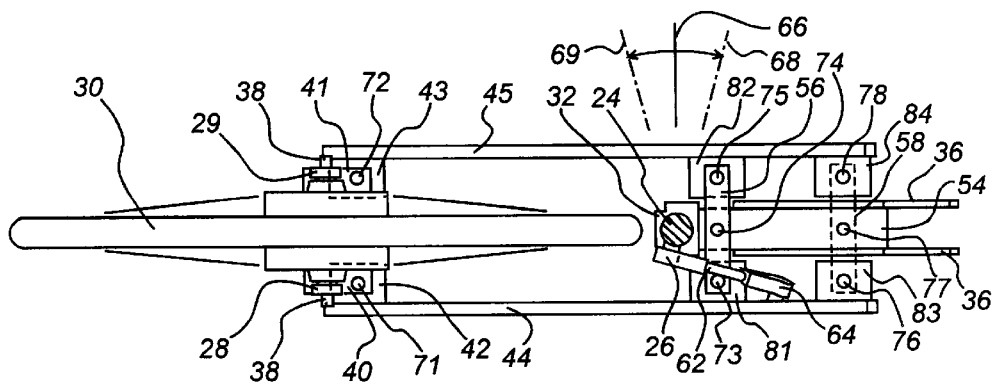
FIG. 4 is a top sectional view of the steering mechanism removed from the bicycle and viewed in a plane nominally 20 degrees elevated from horizontal.

FIG. 3 is a side view of the steering mechanism illustrated in FIG. 2. FIG. 4 is a top view of the steering mechanism illustrated in FIG. 2, with the FIG. 4 top view illustrated at an angle nominally 20 degrees elevated from horizontal, and viewed with the hand grips 22 of FIG. 2 removed. The first front wheel mounting bar 28 is fastened to the end of the axle 38 of the front wheel 30 using a common threaded nut. The first front wheel mounting bar 28 is fastened to a first mounting block 40 using a common screw. The first front bearing block 42 is fastened to a first support arm 44 with common screws. The first front bearing block 42 contains a pair of opposing common rotational antifriction bearings. A first pivot 71 passes through the pair of common rotational antifriction bearings of the first front bearing block 42 and is fastened with screw threads into the first mounting block 40. The first pivot 71 consists of a common cap screw having a shaft diameter which is nearly the same as the inside diameter of the common rotational antifriction bearings, and which is threaded into the first mounting block 40 sufficiently to hold secure, while permitting the free rotation of, the pair of common rotational antifriction bearings through which it passes.

The second front wheel mounting bar 29 is fastened to the end of the axle 38 of the front wheel 30 using a common threaded nut. The second front wheel mounting bar 29 is fastened to a second mounting block 41 using a common screw. The second front bearing block 43 is fastened to a second support arm 45 with common screws. The second front bearing block 43 contains a pair of opposing common rotational antifriction bearings. A second pivot 72 passes through the pair of common rotational antifriction bearings of the second front bearing block 43 and is fastened with screw threads into the second mounting block 41. The second pivot 72 consists of a common cap screw having a shaft diameter which is nearly the same as the inside diameter of the common rotational antifriction bearings, and which is threaded into the second mounting block 41 sufficiently to hold secure, while permitting the free rotation of, the pair of common rotational antifriction bearings through which it passes.

The first pivot 71 and the second pivot 72 are substantially axially parallel with each other and substantially lie in a geometric plane parallel to that of the longitudinal axis of the axle 38. The first support arm 44 is substantially parallel to the second support arm 45. With this arrangement the front wheel 30 is securely connected to the first support arm 44 and the second support arm 45, yet is free to pivot when the first support arm 44 and second support arm 45 move longitudinally relative to each other. The pivot axis 48 of the front wheel 30 substantially lies mid-way between, substantially parallel to, and substantially in the same geometric plane as the axes of the first pivot 71 and the second pivot 72. The angle between the pivot axis 48 and the horizontal axis 50 is nominally 70 degrees. The distance between the pivot axis 48 and the parallel front wheel radial axis 52 is nominally 25 millimeters. This angle and distance provide a steering rake and offset normally provided by conventional bicycle fork geometry.

The center bearing block 54 is fastened to the mounting plates 36 using common screws. A fourth pivot 74 passes through an opposing pair of common rotational antifriction bearings contained in the center bearing block 54 and is fastened by screw threads into the center of the first cross bar 56. A seventh pivot 77 passes through another opposing pair of common rotational antifriction bearings contained in the center bearing block 54 and is fastened by screw threads into the center of the second cross bar 58.

At one end of the first cross bar 56 a third pivot 73 passes through an opposing pair of common rotational antifriction bearings contained in a first side bearing block 81 and is fastened by screw threads into the first cross bar 56. The first side bearing block 81 is fastened to the first support arm 44 using common screws. At the other end of the first cross bar 56 a fifth pivot 75 passes through an opposing pair of common rotational antifriction bearings contained in a second side bearing block 82 and is fastened by screw threads into the first cross bar 56. The second side bearing block 82 is fastened to the second support arm 45 using common screws.

At one end of the second cross bar 58 a sixth pivot 76 passes through an opposing pair of common rotational antifriction bearings contained in a third side bearing block 83 and is fastened by screw threads into the second cross bar 58. The third side bearing block 83 is fastened to the first support arm 44 with common screws. At the other end of the second cross bar 58 an eighth pivot 78 passes through an opposing pair of common rotational antifriction bearings contained in a fourth side bearing block 84 and is fastened by screw threads into the second cross bar 58. The fourth side bearing block 84 is fastened to the second support arm 45 with common screws.

The third pivot 73, fourth pivot 74, and fifth pivot 75 each consists of a common cap screw having a shaft diameter which is nearly the same as the inside diameter of the common rotational antifriction bearings, and which is threaded into the first cross bar 56 sufficiently to hold secure, while permitting the free rotation of, the pairs of common rotational antifriction bearings through which these pass. The third pivot 73, fourth pivot 74, and fifth pivot 75 are substantially axially parallel with the axis of the first pivot 71 and substantially lie in a geometric plane parallel to the longitudinal axis of the axle 38.

The sixth pivot 76, seventh pivot 77, and eighth pivot 78 each consists of a common cap screw having a shaft diameter which is nearly the same as the inside diameter of the common rotational antifriction bearings, and which is threaded into the second cross bar 58 sufficiently to hold secure, while permitting the free rotation of, the pairs of common rotational antifriction bearings through which these pass. The sixth pivot 76, seventh pivot 77, and eighth pivot 78 are substantially axially parallel with the axis of the first pivot 71 and substantially lie in a geometric plane parallel to the longitudinal axis of the axle 38.

The fourth pivot 74 and the seventh pivot 77 substantially lie in the geometric plane of the radial axis of the front wheel 30 when the front wheel 30 is in its normal straight ahead orientation. The first pivot 71, the third pivot 73, and the sixth pivot 76 substantially lie in a geometric plane parallel to the geometric plane formed by the fourth pivot 74 and the seventh pivot 77. The second pivot 72, the fifth pivot 75, and the eighth pivot 78 substantially lie in a geometric plane parallel to the geometric plane formed by the fourth pivot 74 and the seventh pivot 77.

Figure 5:
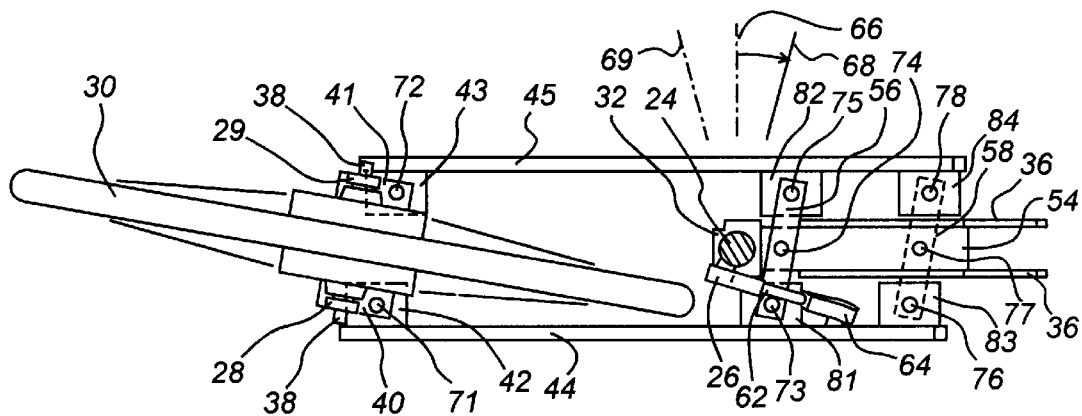
FIG. 5 is a top sectional view of the steering mechanism removed from the bicycle and viewed in a plane nominally 20 degrees elevated from horizontal, with the wheel steered full clockwise.
Figure 6:
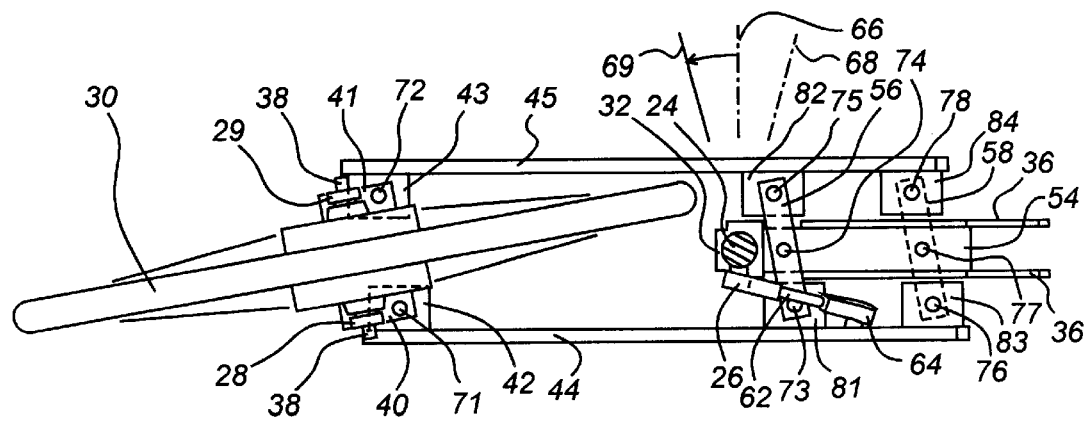
FIG. 6 is a top sectional view of the steering mechanism removed from the bicycle and viewed in a plane nominally 20 degrees elevated from horizontal, with the wheel steered full counter-clockwise.

With this arrangement, the first support arm 44 and the second support arm 45 are restrained to being parallel to the mounting plates 36, but are free to translate together in opposite longitudinal directions. FIG. 5 and FIG. 6 illustrates this parallel restraint and opposite longitudinal translation by showing the location of the first support arm 44 and second support arm 45 when translated to opposite extremes.

The upper ball and socket joint 26 is fastened by screw threads into the steering shaft 24. The free end of the upper ball and socket joint 26 is connected by way of a threaded rod 62 to the free end of a lower ball and socket joint 64. The lower ball and socket joint 64 is fastened by screw threads into the first support arm 44. With this arrangement, axial rotation of the steering shaft 24 results in longitudinal translation of the first support arm 44. When the steering shaft 24 is rotationally aligned with its normal radial axis location 66 as illustrated in FIG. 4, the longitudinal axes of the first support arm 44 and the substantially parallel second support arm 45 are substantially orthogonal to the longitudinal axis of the first cross bar 56 and the longitudinal axis of the second cross bar 58, and the radial axis of the front wheel 30 is substantially parallel to the longitudinal axes of the first support arm 44 and the second support arm 45. When the steering shaft 24 is rotationally aligned with its full clockwise radial axis location 68 as illustrated in FIG. 5, the first support arm 44 and the second support arm 45 are translated relative to each other longitudinally, and the front wheel 30 is rotated to its full clockwise position. When the steering shaft 24 is rotationally aligned with its full counter-clockwise radial axis location 69 as illustrated in FIG. 6, the first support arm 44 and the second support arm 45 are translated relative to each other longitudinally and to the opposite extreme as that illustrated in FIG. 5, and the front wheel 30 is rotated to its full counter-clockwise position.

With this arrangement, the rider of the bicycle illustrated in FIG. 1 is able to set and vary the angle of the front wheel 30 relative to the longitudinal axis of the bicycle illustrated in FIG. 1 by controlling the angular orientation of the steering shaft 24 through control forces applied at the hand grips 22. With this arrangement, steering of the bicycle illustrated in FIG. 1 is achieved.

The foregoing description and the accompanying drawings of the preferred embodiment of the invention has been presented for the purposes of illustration and description. It is not intended to be exhaustive or to limited the invention to the precise form disclosed. Many modifications and variations are possible in light of the above teaching. It is intended that the scope of the invention be limited not by this detailed description or the accompanying drawings, but rather by the claims appended hereto.

I claim:

1. A machine having a vehicle with a wheel, wherein said machine changes the angle of the wheel, said machine comprising:

a) an axle of said wheel;

b) a first support arm wherein said first support arm and said second support arm are disposed entirely below said axle;

c) a second support arm which is substantially parallel to said first support arm;

d) a means of pivotally connecting said first support arm to said axle;

e) a means of pivotally connecting said second support arm to said axle whereby said second support arm is a predetermined distance from said first support arm and whereby the pivotal axis of the connection of said second support arm to said axle is substantially parallel to the pivotal axis of the connection of said first support arm to said axle;

f) a first cross member which is substantially parallel to said axle;

g) a second cross member which is substantially parallel to said axle;

h) a means of pivotally connecting said first cross member to said first support arm whereby the pivotal axis of the connection is generally parallel to the pivotal axis of the connection of said first support arm to said axle;

i) a means of pivotally connecting said first cross member to said second support arm whereby the pivotal axis of the connection is generally parallel with the pivotal axis of the connection of said first support arm to said axle and whereby the geometric plane formed by the pivotal axis of the connection of said first cross member to said second support arm and the pivotal axis of the connection of said first cross member to said first support arm is generally parallel to the geometric plane formed by the pivotal axis of the connection of said first support arm to said axle and the pivotal axis of the connection of said second support arm to said axle;

j) a means of pivotally connecting said second cross member to said first support arm whereby the pivotal axis of the connection is generally parallel to the pivotal axis of the connection of said first support arm to said axle;

k) a means of pivotally connecting said second cross member to said second support arm whereby the pivotal axis of the connection is generally parallel with the pivotal axis of the connection of said first support arm to said axle and whereby the geometric plane formed by the pivotal axis of the connection of said second cross member to said second support arm and the pivotal axis of the connection of the second cross member to said first support arm is generally parallel to the geometric plane formed by the pivotal axis of the connection of said first support arm to said axle and the pivotal axis of the connection of said second support arm to said axle;

l) a structure of said vehicle;

m) a means of pivotally connecting said first cross member to said structure whereby the pivotal axis of the connection is generally parallel with the pivotal axis of the connection of said first support arm to said axle;

n) a means of pivotally connecting said second cross member to said structure whereby the pivotal axis of the connection is generally parallel with the pivotal axis of the connection of said first support arm to said axle and whereby the geometric plane formed by the pivotal axis of the connection of said second cross member to said structure and the pivotal axis of the connection of the first cross member to said structure is parallel to the geometric plane formed by the pivotal axis of the connection of said first cross member to said first support arm and the pivotal axis of the connection of said second cross member to said first support arm; and o) a means of changing the angle of said axle relative to said structure.

2. A machine as recited in claim 1, wherein said first support arm is located on one side of said wheel and said second support arm is located on the other side of said wheel.

3. A machine as recited in claim 1, wherein said vehicle is selected from a group consisting of a recumbent bicycle and a bicycle and a motorized cycle.

4. A machine as recited in claim 3, wherein said wheel is the front wheel.

5. A machine as recited in claim 1, wherein said means of changing the angle of said axle relative to said structure comprises:

a) a steering shaft rotatably mounted on said vehicle;

b) a first ball and socket joint mounted onto said steering shaft; and c) a second ball and socket joint mounted together with said first ball and socket joint, with said second ball and socket joint mounted onto the machine.

6. A machine as recited in claim 1, wherein said means of changing the angle of said axle relative to said structure comprises a means which permits a human controlling the movement direction of the vehicle to change the location of said first support arm relative to the location of said second support arm.

7. A machine having a vehicle with a wheel, wherein said machine changes the angle of the wheel, said machine comprising:

a) an axle of said wheel;

b) a first support arm;

c) a first pivot which rotatably connects said first support arm to said axle;

d) a second support arm;

e) a second pivot which is substantially parallel to said first pivot and which rotatably connects said second support arm to said axle;

f) a first cross member;

g) a third pivot which is substantially parallel to said first pivot and which rotatably connects said first cross member to said first support arm;

h) a structure of said vehicle;

i) a fourth pivot which is substantially parallel to said first pivot and which rotatably connects said first cross member to said structure;

j) a fifth pivot which is substantially parallel to said first pivot and which rotatably connects said first cross member to said second support arm;

k) a second cross member;

l) a sixth pivot which is substantially parallel to said first pivot and which rotatably connects said second cross member to said first support arm;

m) a seventh pivot which is substantially parallel to said first pivot and which rotatably connects said second cross member to said structure; and n) an eighth pivot which is substantially parallel to said first pivot and which rotatably connects said second cross member to said second support arm.

8. A machine as recited in claim 7, wherein said first support arm is located on one side of said wheel and said second support arm is located on the other side of said wheel.

9. A machine as recited in claim 7, wherein said vehicle is selected from a group consisting of a recumbent bicycle and a bicycle and a motorized cycle.

10. A machine as recited in claim 9, wherein said wheel is the front wheel.

11. A machine as recited in claim 7, wherein:

a) a first geometric plane is formed by the substantially co-planer axes of said first pivot and said third pivot and said sixth pivot;

b) a second geometric plane is formed by the substantially co-planer axes of said third pivot and said seventh pivot;

c) a third geometric plane is formed by the substantially co-planer axes of said second pivot and said fifth pivot and said eighth pivot;

d) said second geometric plane is substantially parallel to said first geometric plane;

e) said third geometric plane is substantially parallel to said first geometric plane;

f) a fourth geometric plane is formed by the axes of said first pivot and said second pivot;

g) a fifth geometric plane is formed by the axes of said third pivot and said fifth pivot;

h) a sixth geometric plane is formed by the axes of said sixth pivot and said eighth pivot;

i) said fifth geometric plane is substantially parallel to said fourth geometric plane; and j) said sixth geometric plane is substantially parallel to said fourth geometric plane.

12. A machine as recited in claim 7, further including a steering means to change the angle of said axle relative to said structure.

13. A machine as recited in claim 7, further including:

a) a steering shaft rotatably mounted on said structure;

b) a first ball and socket joint mounted on said steering shaft; and c) a second ball and socket joint connected to said first ball and socket joint and connected to a selection from the group consisting of said first support arm and said second support arm and said first cross member and said second cross member and said axle and said first pivot and said second pivot and said third pivot and said fourth pivot and said fifth pivot and said sixth pivot and said seventh pivot and said eighth pivot.

14. A recumbent bicycle, comprising:

a) a elongated frame having a seat thereupon;

b) a rotatable rear wheel permitting said bicycle to roll on the ground;

c) a rotatable front wheel permitting said bicycle to roll on the ground and capable of being turned with respect to said frame about a turning axis extending through the general plane of said front wheel; and d) a supporting means for supporting said front wheel, said supporting means having first and second support arms which move to cause said front wheel, wherein said first and second support arms are disposed entirely below an axle of said rotatable front wheel, to turn and having members that only connect to said frame longitudinally beyond said front wheel.

15. The recumbent bicycle of claim 14, wherein said supporting means is connected to said frame rearward of said front wheel.

16. The recumbent bicycle of claim 14, wherein said supporting means comprising:

e) a second pivot which is substantially parallel to said first pivot and which rotatably connects said second support arm to said axle;

f) a first cross member;

g) a third pivot which is substantially parallel to said first pivot and which rotatably connects said first cross member to said first support arm;

h) a fourth pivot which is substantially parallel to said first pivot and which rotatably connects said first cross member to said frame;

i) a fifth pivot which is substantially parallel to said first pivot and which rotatably connects said first cross member to said second support arm;

j) a second cross member;

k) a sixth pivot which is substantially parallel to said first pivot and which rotatably connects said second cross member to said first support arm;

l) a seventh pivot which is substantially parallel to said first pivot and which rotatably connects said second cross member to said frame; and m) an eighth pivot which is substantially parallel to said first pivot and which rotatably connects said second cross member to said second support arm.

17. The recumbent bicycle of claim 16, wherein said supporting means further comprising:

a) a first geometric plane which is formed by the substantially co-planer axes of said first pivot and said third pivot and said sixth pivot;

b) a second geometric plane which is formed by the substantially co-planer axes of said third pivot and said seventh pivot, where said second geometric plane is substantially parallel to said first geometric plane;

c) a third geometric plane which is formed by the substantially co-planer axes of said second pivot and said fifth pivot and said eighth pivot, where said third geometric plane is substantially parallel to said first geometric plane;

d) a fourth geometric plane which is formed by the axes of said first pivot and said second pivot;

e) a fifth geometric plane which is formed by the axes of said third pivot and said fifth pivot, where said fifth geometric plane is substantially parallel to said fourth geometric plane; and f) a sixth geometric plane which is formed by the axes of said sixth pivot and said eighth pivot, where said sixth geometric plane is substantially parallel to said fourth geometric plane.

18. The recumbent bicycle of claim 14, further including a steering means to turn said front wheel.

19. The recumbent bicycle of claim 18, wherein said steering means comprising:

a) a steering shaft rotatably mounted on said frame;

b) a first ball and socket joint mounted on said steering shaft; and c) a second ball and socket joint connected to said first ball and socket joint and connected to a selection from the group consisting of said first support arm and said second support arm and said first cross member and said second cross member and said axle and said first pivot and said second pivot and said third pivot and said fourth pivot and said fifth pivot and said sixth pivot and said seventh pivot and said eighth pivot.

* * * * *